Figure 1:
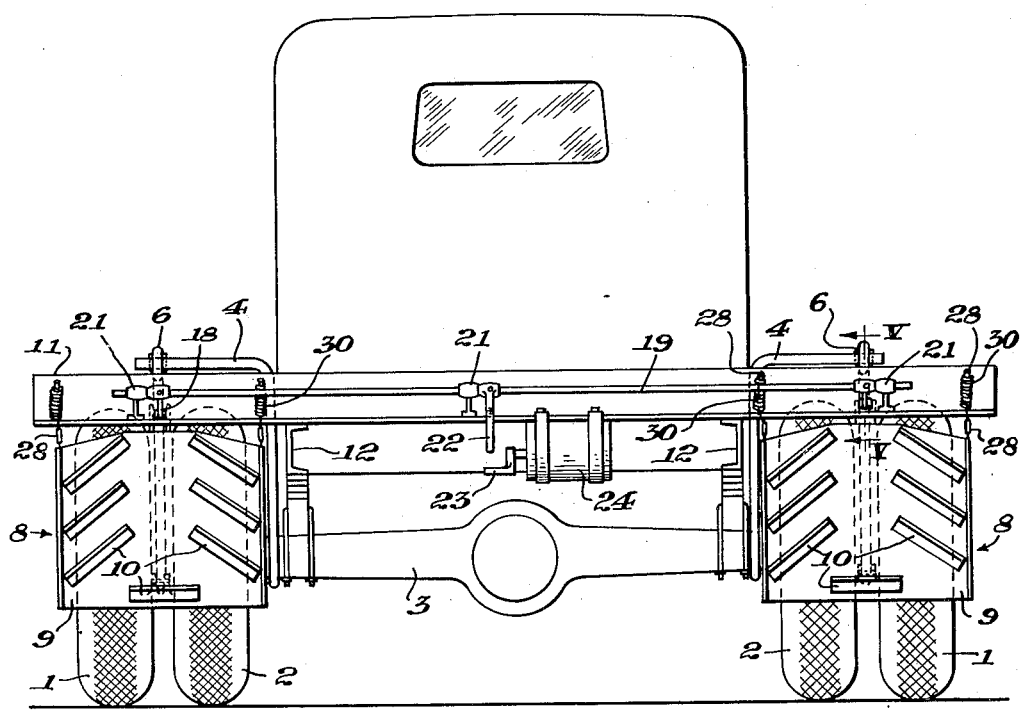

July 4, 1950      E. TOWER      2,513,691
NONSKID EMERGENCY SHOE FOR MOTOR VEHICLE WHEELS Filed May 4, 1948      2 Sheets-Sheet 1

INVENTOR.
EMERY TOWER.
BY
Brown, Critchlow, Flick & Peckham
his ATTORNEYS.

July 4, 1950  E. TOWER  2,513,691
NONSKID EMERGENCY SHOE FOR MOTOR VEHICLE WHEELS
Filed May 4, 1948  2 Sheets-Sheet 2

INVENTOR.
EMERY TOWER.
BY Brown, Critchlow, Flick & Peckham
his ATTORNEYS.

Patented July 4, 1950

2,513,691

UNITED STATES PATENT OFFICE 2,513,691

NONSKID EMERGENCY SHOE FOR MOTOR VEHICLE WHEELS

Emery Tower, Flint, Mich.

Application May 4, 1948, Serial No. 25,016

5 Claims. (Cl. 188—4)

This invention relates to motor vehicles, and more particularly to safety apparatus designed to stop undesired rolling on hills as well as skidding.

Many serious accidents are caused by the inability of the drivers of motor vehicles, particularly trucks, to stop their vehicles after they start to skid. Also, it is difficult to start a heavy truck up a hill on which it has stopped, especially if the pavement is wet or icy. When the driver takes his foot from the brake, the truck generally will start to drift back before enough power can be applied to the wheels to move it forward. If the pavement is slippery, the truck also will start to skid and may refuse to go forward. When the truck is parked on a grade, there always is the danger that it will roll away unless the wheels are blocked.

It is among the objects of this invention to provide safety apparatus of simple and durable construction which can be readily applied to motor vehicles and which can be used in emergencies to stop skidding, to aid the vehicle in starting up a hill from a standstill, and to block the wheels when parked.

In accordance with this invention a pair of non-skid shoes are provided, each of which is adapted to support a wheel or set of dual wheels of a motor vehicle. Arms, which have their upper ends pivotally connected to the vehicle, are connected at their lower ends to the shoes so that the shoes normally can be swung lengthwise of the vehicle and upward to an inoperative position. When used with dual wheels, each arm can swing between a pair of wheels. Preferably, the lower ends of the arms are pivotally connected to one end of the shoes, and means are provided for supporting the opposite end of the shoes from the arms so that the shoes will not swing too far down away from the arms. The shoes are held in their inoperative position by latching means which can be tripped by the driver to release the shoes so that they will swing down to the ground close to the wheels. If the wheels then roll toward the shoes they will roll onto them and come to rest, because means are provided for limiting the distance that the wheels can roll across the shoes. Such means preferably take the form of chains connected to the shoes and to the vehicle at the side of the wheels where the inoperative position of the shoes is located. These chains may be fastened to a cross beam mounted on the vehicle. This beam also supports the shoe latching means which may include a rotatable horizontal shaft that is adapted, when turned, to withdraw horizontal pins from holes in the upper ends of the suspended shoes which normally are hung from these pins. The shaft can be turned, when desired, by means of an electric motor controlled by the driver of the vehicle. The inoperative or suspended position of the shoes may be located either in front of the wheels or in back of them, depending on whether it is forward or backward movement of the vehicle that is to be guarded against. If desired, shoes may be hung in both positions so that the vehicle can be stopped from moving either forward or backward in an emergency.

Figure 2:
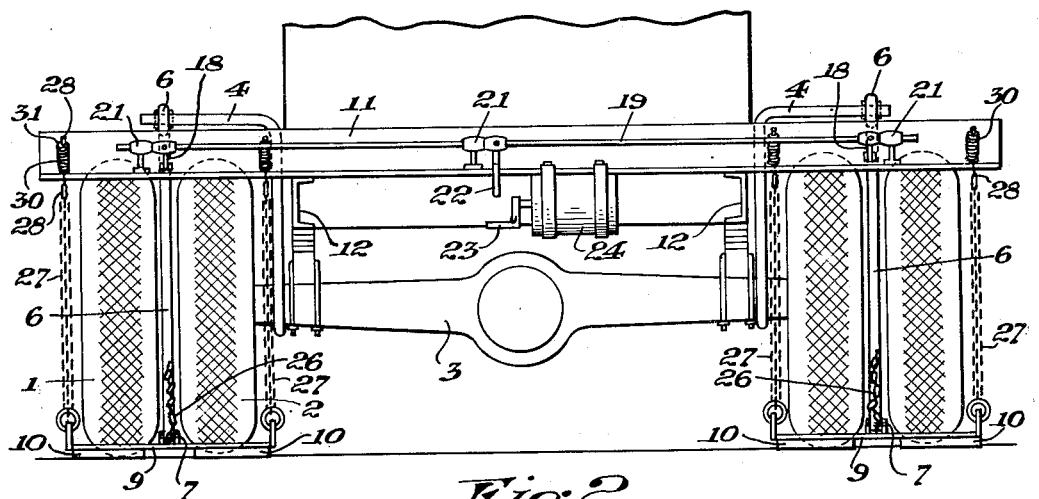
Figure 3:
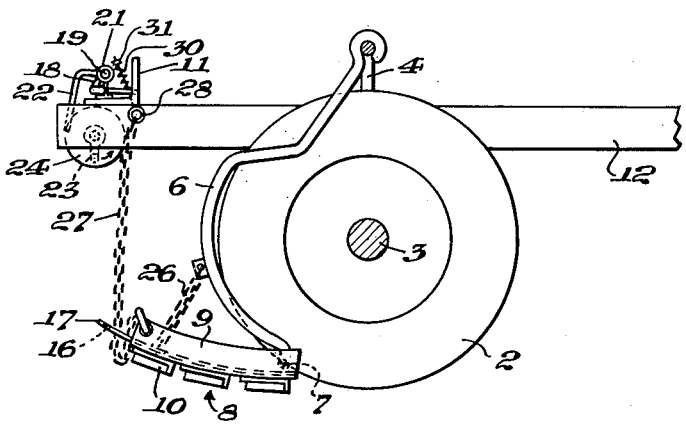
Figure 4:
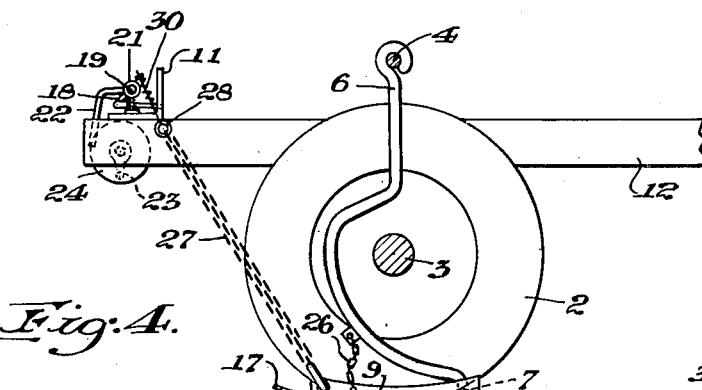
Figures 5, 6:
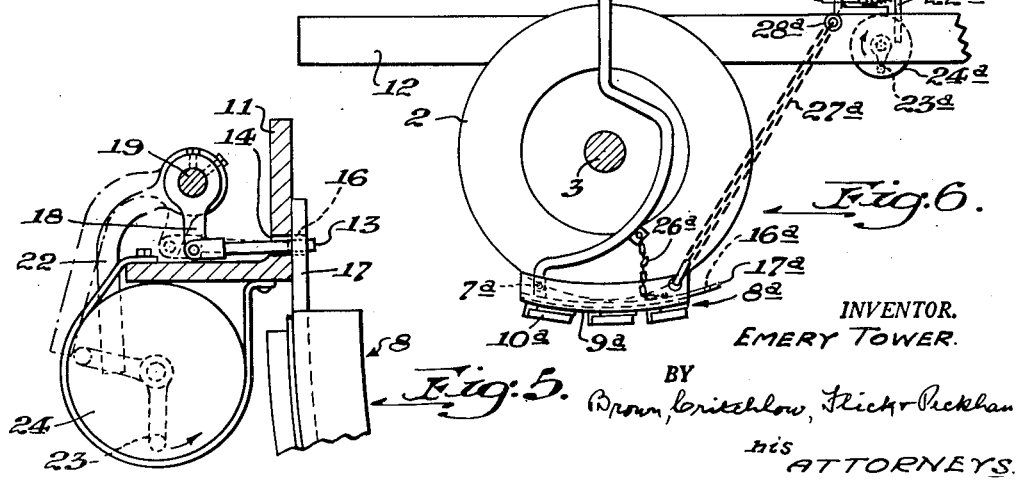

The preferred embodiment of the invention is illustrated in the accompanying drawings, in which Fig. 1 is a rear view of a truck with the safety shoes hanging in inoperative position; Fig. 2 is a fragmentary rear view of the truck showing the shoes in operative position; Fig. 3 is a fragmentary side view of the rear end of the truck with one of the dual wheels removed and showing a safety shoe engaging the ground behind the other wheel; Fig. 4 is a view similar to Fig. 3, but with the wheel rolled back on the shoe; Fig. 5 is an enlarged detail taken on the line V—V of Fig. 1; and Fig. 6 is a view similar to Fig. 4, showing the shoes operating from in front of the wheels.

Referring to the first four figures of the drawings, a pair of wheels 1 and 2 are mounted on each end of the rear axle 3 of a truck, and an inverted L-shaped bracket 4 is rigidly connected at its lower end in any suitable manner to the axle near each inner wheel 2. The upper part of each bracket extends outward across the adjacent inner wheel and through the looped upper end of an arm 6 that is suspended from the bracket so that it can swing between the dual wheels. When the arm is in its lower or most forward position, as shown in Fig. 4 where rolling back is being prevented, it curves rearwardly around the axle between the two wheels and then extends in front of the axle. In this embodiment of the invention the lower end of each arm is pivotally connected at 7 to the front central portion of a non-skid shoe 8 which is formed from a metal channel 9 having lugs 10 welded to its bottom for gripping the ground or road bed. Each shoe is wide enough to accommodate on its upper surface a pair of the dual wheels. Of course, if dual wheels are not used, the shoes are made correspondingly narrower.

When the shoes are not in use they are hung from a horizontal cross beam 11, preferably an angle bar, rigidly mounted on the truck frame 12 behind the wheels. In their inoperative position, shown in Fig. 1, the shoes serve as shields or guards behind the wheels to intercept stones and the like that are thrown back by the wheels. For suspending the shoes from the beam, as best shown in Fig. 5, there are a pair of substantially horizontal pins 13 projecting forward from holes 14 in the bottom of the vertical flange of the beam. These pins also extend through holes 16 in ears 17 attached to the rear ends of the shoes, so that the shoes are hung from the pins. The rear ends of the pins are pivotally connected to the lower ends of short arms 18 extending down from a horizontal shaft 19 on which their upper ends are rigidly mounted. The shaft extends along beam 11 and is journaled in bearing members 21 projecting up from the horizontal flange of the beam. Rigidly connected to the central portion of the shaft is a rearwardly and downwardly extending lever 22 by which the shaft can be turned to cause its arms 18 to withdraw the pins from the holes in the shoe ears. This lever is swung back to turn the shaft by means of a crank 23 that is rotated by an electric motor 24 clamped to the bottom of the cross beam. The motor is controlled by an electric switch (not shown) in the cab of the truck.

When the shoes are released, they drop by gravity and are simultaneously swung forward by arms 6 until they strike the pavement or road directly behind the wheels as shown in Fig. 3. To keep the back of the shoes from swinging down too far around their pivots 7, the rear ends of the shoes are connected by short chains 26 to the curved part of the arms above them. The distance that the wheels can roll back across the shoes is determined and controlled by tension members or chains 27 connected to the rear ends of the shoe flanges. These chains extend rearward and upward to the cross beam where their upper ends are connected to eye bolts 28 extending slidably through holes in the lower flange of the beam. Above that flange coil springs 30 that encircle the bolts are compressed between the beam and nuts 31 on the upper ends of the bolts. These springs absorb the shock as the tension chains are pulled straight when the wheels roll back onto the shoes as shown in Figs. 2 and 4. The chains are long enough to permit the wheels to roll only about half way back across the shoes so that they will be centered on the shoes when they come to rest. It will be noted that the wheels are completely supported by the shoes which space them from the road.

If the truck is parked heading up a hill, the shoes can be dropped behind the wheels and the truck allowed to drift back until the wheels are on the shoes as shown in Fig. 4. The shoes then will prevent any further backward movement of the truck, even when the brakes are released preparatory to starting up the hill again. In case the truck is stopped only momentarily on the hill, or the engine is stalled, the shoes can be dropped behind the wheels where they will limit the distance that the truck can drift back while the driver is trying to get it to move forward again. If the road is slippery and the wheels start to skid so that the truck begins to slide back, or backwards and to the side, the wheels can be allowed to roll back onto the shoes which will stop the skid and furnish a firm footing so that the truck can get started forward again.

The non-skid shoes 8 can be used in conjunction with a similar pair of shoes in front of the wheels, or the latter shoes can be used alone when only forward movement of the vehicle is to be stopped. Thus, as shown in Fig. 6, the entire safety apparatus described above can be turned around and mounted in front of the wheels. The parts of this apparatus in Fig. 6 bear the same designation numbers as before, except that the letter a has been added. Therefore, the construction of the apparatus need not be described again, except to mention a spring 35 that connects shaft lever 22a to cross beam 11a so that the lever is always urged toward the beam. This spring, which also can be used with the first embodiment of the invention, insures that shoe-supporting pins 13a will not work back out of operative position and accidentally release the shoes.

Shoes 8a can be used to block forward movement of the vehicle when parked on a down grade. They also can be dropped in front of the wheels to stop the vehicle from skidding ahead or forward and to the side. In emergencies they can be used to stop the vehicle more quickly than it can be stopped by its brakes, because the wheels will run up off the road onto the shoes.

The end of the shoe to which the supporting arm is pivoted is the end which strikes the ground first when the shoe is dropped, and therefore is referred to herein as the leading end. The opposite end of the shoe is referred to herein as the trailing end.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Safety apparatus for motor vehicles having dual rear wheels, comprising a pair of non-skid shoes each adapted to support on top of itself a pair of said wheels, an arm movable between each pair of wheels and connected at its lower end to the leading end of the underlying shoe, means adapted to connect the upper ends of the arms to the vehicle above its rear axle so that the shoes can be swung lengthwise of the vehicle and upward to inoperative position when free of the wheels, said arms being curved to extend part way around the axle, latching means for connection to the trailing ends of the shoes to hold them in said inoperative position, manually controlled means for tripping the latching means to release the shoes so that they will swing down to the ground close to said wheels, and means for limiting the distance that said wheels can roll across the shoes.

2. Safety apparatus for motor vehicles, comprising a pair of non-skid shoes adapted to support on top of themselves wheels of a motor vehicle, arms connected at their lower ends to the leading ends of the shoes, means adapted to pivotally connect the upper ends of the arms to the vehicle above the axle of said wheels so that the shoes can be swung lengthwise of the vehicle and upward to inoperative position when free of the wheels, said arms being curved to extend part way around the axle, a cross beam adapted to be mounted on the vehicle at the side of the wheels adjacent said inoperative position, latching means mounted on said beam for connection to the trailing ends of the shoes to hold them in said inoperative position, manually controlled means for tripping the latching means to release the shoes so that they will swing down to the ground close to said wheels, tension members connected at one end to the trailing ends of the shoes, and means connecting the opposite ends of said members to said beam to limit the distance that said wheels can roll across the shoes toward said beam.

3. Safety apparatus for motor vehicles, comprising a pair of non-skid shoes adapted to support on top of themselves wheels of a motor vehicle, arms connected at their lower ends to the shoes, means adapted to pivotally connect the upper ends of the arms to the vehicle so that the shoes can be swung lengthwise of the vehicle and upward to inoperative position when free of the wheels, a cross beam adapted to be mounted on the vehicle at the side of the wheels adjacent said inoperative position, a horizontal shaft pivotally mounted on said beam, latching members carried by the shaft for releasably engaging the shoes to hold them in said inoperative position, an electric motor for turning the shaft to release said latching members from the shoes so that the shoes will swing down to the ground close to said wheels, and means for limiting the distance that said wheels can roll across the shoes toward said beam.

4. Safety apparatus for motor vehicles, comprising a pair of non-skid shoes adapted to support on top of themselves wheels of a motor vehicle, arms connected at their lower ends to the shoes, means adapted to pivotally connect the upper ends of the arms to the vehicle so that the shoes can be swung lengthwise of the vehicle and upward to inoperative position when free of the wheels, a cross beam adapted to be mounted on the vehicle at the side of the wheels adjacent said inoperative position, a horizontal shaft pivotally mounted on said beam, latching members carried by the shaft for releasably engaging the shoes to hold them in said inoperative position, a lever projecting from said shaft, an electric motor, a crank driven by the motor for swinging said lever to turn the shaft so that said latching members will release the shoes and permit them to swing down to the ground close to said wheels, and chains connected to the shoes and to said beam to limit the distance that said wheels can roll across the shoes toward said beam.

5. Safety apparatus for motor vehicles, comprising a pair of non-skid shoes adapted to support on top of themselves wheels of a motor vehicle, one end of the shoes being provided with holes, arms connected at their lower ends to the shoes, means adapted to pivotally connect the upper ends of the arms to the vehicle so that the shoes can be swung lengthwise of the vehicle and upward to inoperative position when free of the wheels, a cross beam adapted to be mounted on the vehicle at the side of the wheels adjacent said inoperative position, a horizontal shaft pivotally mounted on said beam, substantially horizontal pins extending slidably through the beam and operatively connected to the shaft, the free ends of the pins being adapted to extend through said shoe holes to support the shoes in said inoperative position, manually controlled means for turning the shaft to withdraw the pins from the shoe holes so that the shoes can swing down to the ground close to said wheels, tension members connected at one end to the shoes, and means adapted to anchor the opposite end of said members to said beam to limit the distance that said wheels can roll across the shoes toward said beam.

EMERY TOWER.

REFERENCES CITED

The following references are of record in the file of this patent:

UNITED STATES PATENTS

| Number | Name | Date |
| --- | --- | --- |
| 1,118,233 | Rinyik | Nov. 24, 1914 |
| 1,130,939 | Stepanka | Mar. 9, 1915 |
| 1,237,108 | Shiel | Aug. 14, 1917 |
| 1,582,911 | Eichorn | May 4, 1926 |
| 2,151,014 | Curtiss | Mar. 21, 1939 |
| 2,174,135 | Parrish | Sept. 26, 1939 |
| 2,182,044 | Ackerman | Dec. 5, 1939 |
| 2,344,148 | Jackson | Mar. 14, 1944 |

FOREIGN PATENTS

| Number | Country | Date |
| --- | --- | --- |
| 379,332 | France | Nov. 5, 1907 |